(12) United States Patent
Naka et al.

(10) Patent No.: US 6,816,245 B2
(45) Date of Patent: Nov. 9, 2004

(54) METHOD OF MEASURING OPTICAL FIBER DRAWING TENSION

(75) Inventors: Yasuhiro Naka, Tokyo (JP); Hiroyuki Kobayashi, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 10/650,050

(22) Filed: Aug. 28, 2003

(65) Prior Publication Data

US 2004/0129029 A1 Jul. 8, 2004

Related U.S. Application Data

(63) Continuation of application No. PCT/JP02/01855, filed on Feb. 28, 2002.

(30) Foreign Application Priority Data

Feb. 28, 2001 (JP) .................................. 2001-055932
Jan. 28, 2002 (JP) .................................. 2002-017989

(51) Int. Cl.⁷ .......................................... G01N 21/00
(52) U.S. Cl. ............................................. 356/73.1
(58) Field of Search .................... 356/73.1; 250/559.24, 250/559.29; 65/381–384; 73/160, 862.41; 364/469.01

(56) References Cited

U.S. PATENT DOCUMENTS

| | | | |
|---|---|---|---|
| 4,692,615 A | | 9/1987 | Mensah et al. |
| 5,079,433 A | | 1/1992 | Smith |
| 5,950,142 A | * | 9/1999 | Shi .............................. 702/42 |
| 6,002,472 A | | 12/1999 | Naka et al. |

FOREIGN PATENT DOCUMENTS

| | | |
|---|---|---|
| JP | 62-5137 | 1/1987 |
| JP | 6-331430 | 12/1994 |
| JP | 10-259035 | 9/1998 |
| JP | 2001-141583 | 5/2001 |
| JP | 2001-153739 | 6/2001 |

OTHER PUBLICATIONS

M. Luukkala, et al., "Sonic Tension Control at High Draw Speed", International Wire & Cable Symposium Proceedings, 1994, pp. 116–120.

C. G. Askins, et al., "Noncontact Measurement of Optical Fiber Draw Tension", Journal of Lightwave Technology, vol. 9, No. 8, Aug. 1991, pp. 945–947.

* cited by examiner

*Primary Examiner*—Tu T. Nguyen
(74) *Attorney, Agent, or Firm*—Oblon, Spivak, McClelland, Maier & Neustadt, P.C.

(57) ABSTRACT

A method of measuring optical fiber-drawing tension, containing: measuring oscillation of an optical fiber when drawing; determining a fundamental oscillation frequency of the optical fiber based on peak frequencies contained in spectrum components of oscillation waveform; and converting the fundamental oscillation frequency into tension applied to the optical fiber being drawn; wherein the determination of the fundamental oscillation frequency is performed through specifying, as a harmonic oscillation series group, a group of peak frequencies containing at least two peak frequencies, in which an interval between zero (0) and first peak frequencies, an interval between first and second peak frequencies, . . . , and an interval between (n−1)th and nth peak frequencies (where n is a natural number) are equal to each other, from among the peak frequencies in the spectrum components, to carry out the method based on the peak frequencies in the specified harmonic oscillation series group.

3 Claims, 4 Drawing Sheets

METHOD OF MEASURING OPTICAL FIBER DRAWING TENSION

This application is a continuation of PCT/JP02/01855 filed Feb. 28, 2002.

TECHNICAL FIELD

The present invention relates to a method of manufacturing an optical fiber, and more specifically, to a method of accurately and stably measuring tension applied to an optical fiber when it is being drawn.

BACKGROUND ART

Generally, when an optical fiber is manufactured, an optical fiber preform is melted by heating from its lower end portion, to pull (draw) the melted and deformed portion thereof into a linear shape. Also, the surface of the optical fiber that is obtained immediately after the drawing by heating, is coated with a thermosetting resin, a UV curing resin or the like. The manufacture of the optical fiber with such heating and pulling means is generally referred to as "drawing".

In case of obtaining an optical fiber through drawing of an optical fiber preform, if tension applied to the optical fiber during drawing is not controlled, there occurs a change in the transmission characteristics, particularly in transmission loss, of the optical fiber in a longitudinal direction. Thus, it is required that the tension when the optical fiber preform is drawn be controlled so as to be a prescribed value. Specifically, there is a need to measure and control tension applied to the optical fiber being drawn.

In addition, in case of measuring the tension applied to the optical fiber, the optical fiber will be damaged when a contact type measuring device is used. Therefore, a non-contact type measuring device is generally used, to measure the tension applied to the optical fiber.

Here, explanation will be made of a method of measuring tension applied to an optical fiber being drawn. A general method of measuring tension applied to an optical fiber being drawn is a method utilizing oscillation of the optical fiber generated when drawing.

According to this method, target tension T is obtained by acquiring a fundamental oscillation frequency f from a peak of a measured oscillation waveform spectrum, and thereafter substituting the fundamental oscillation frequency f for the following equation (1).

$$T = (2 \cdot L \cdot f)^2 \cdot \rho \cdot \alpha \qquad \text{Equation (1)}$$

In the equation (1) above, L represents a distance between an optical fiber preform and a coating die used for forming a first coating layer on the optical fiber (first coating die). Further, ρ represents a linear density, and α represents a correction factor.

On the other hand, for enabling measurement of the tension T using the equation (1) above, it is required that the fundamental oscillation frequency f be obtained. As a conventional method, as shown in JP-A-62-137531 ("JP-A" means unexamined published Japanese patent application), there is known a method in which an oscillation waveform is subjected to the Fourier transform and a fundamental oscillation frequency is determined based on frequency components of the resulting oscillation waveform.

However, in the method disclosed in JP-A-62-137531, in a case where there are spectrum peaks other than that of the fundamental oscillation frequency, it becomes difficult to determine the fundamental oscillation frequency. In an actual case, there arise a peak of oscillation, which is obtained by multiplying the fundamental oscillation frequency by an integer, and a peak which does not correspond to the fundamental oscillation frequency multiplied by an integer. Therefore, it is required that influence caused by those peaks be removed.

Therefore, as shown in U.S. Pat. No. 5,079,433, there is a method of finding a set of spectrum peaks that are close to relation between the fundamental oscillation frequency and a double frequency, from among all of the spectrum peaks.

Further, as shown in JP-A-10-316446, there is a method in which, when performing the first time peak frequency retrieval, the retrieval is conducted within a frequency range where it is expected that a peak frequency is included, for example, in a vicinity of a target value, to thereby perform subsequent peak frequency retrievals in a state where a median value of the peak frequency retrieval is moved to the previously detected peak frequency.

However, in the technique described in U.S. Pat. No. 5,079,433 and JP-A-10-316446, there is fear that error measurement of the fundamental oscillation frequency arises in a case where a noise is a frequency that is close to the fundamental oscillation frequency of the optical fiber or that is close to the frequency obtained by multiplying the fundamental oscillation frequency by an integer, or in a case where there is a noise peak within the peak retrieval range.

Therefore, in the conventional methods, there has been required means for accurately measuring the tension applied to the optical fiber being drawn, by precisely recognizing the fundamental oscillation frequency of the optical fiber regardless of noise generating conditions.

DISCLOSURE OF THE INVENTION

Figure 1:
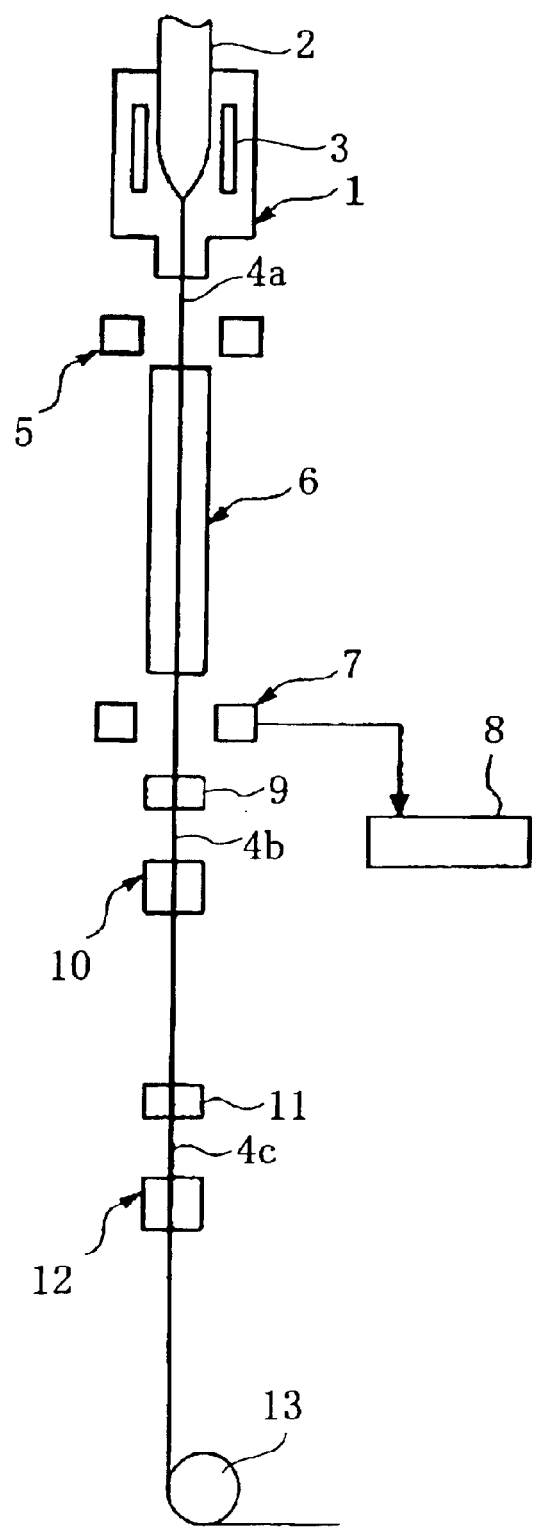
FIG. 1 is a schematic explanatory diagram showing an example of an optical fiber drawing device, to which is applied a method of measuring tension applied to an optical fiber being drawn, which method is an embodiment of the present invention.

The present invention is a method of measuring tension applied to an optical fiber being drawn, which method comprises: measuring oscillation of the optical fiber when drawing into the optical fiber; subjecting a waveform of the oscillation to frequency analysis to obtain spectrum components; determining a fundamental oscillation frequency of the optical fiber based on peak frequencies contained in the spectrum components; and converting the fundamental oscillation frequency into the tension applied to the optical fiber being drawn, characterized in that the determination of the fundamental oscillation frequency of the optical fiber is performed through the steps comprising:

specifying, as a harmonic oscillation series group, a group of peak frequencies containing at least two peak frequencies, in which an interval between a frequency zero (0) and a first peak frequency, an interval between the first peak frequency and a second peak frequency, . . . , and an interval between an (n−1)th peak frequency and an nth peak frequency (in which n is a natural number) are equal to each other, from among a plurality of peak frequencies contained in the spectrum components; and determining the fundamental oscillation frequency of the optical fiber based on the respective peak frequencies contained in the specified harmonic oscillation series group.

Other and further features and advantages of the invention will appear more fully from the following description, taken in connection with the accompanying drawings.

BEST MODE FOR CARRYING OUT THE INVENTION

According to the present invention, there are provided the following means:

(1) A method of measuring tension applied to an optical fiber being drawn, comprising: measuring oscillation of the optical fiber when drawing into the optical fiber; subjecting a waveform of the oscillation to frequency analysis to obtain spectrum components; determining a fundamental oscillation frequency of the optical fiber based on peak frequencies contained in the spectrum components; and converting the fundamental oscillation frequency into the tension applied to the optical fiber being drawn, characterized in that the determination of the fundamental oscillation frequency of the optical fiber is performed through the steps comprising:

specifying, as a harmonic oscillation series group, a group of peak frequencies containing at least two peak frequencies, in which an interval between a frequency zero (0) and a first peak frequency, an interval between the first peak frequency and a second peak frequency, . . . , and an interval between an (n−1)th peak frequency and an nth peak frequency (in which n is a natural number) are equal to each other, from among a plurality of peak frequencies contained in the spectrum components; and determining the fundamental oscillation frequency of the optical fiber based on the respective peak frequencies contained in the specified harmonic oscillation series group;

(2) The method of measuring tension applied to an optical fiber being drawn according to the item (1), characterized in that, when specifying the harmonic oscillation series group, autocorrelation of the spectrum components is calculated, thereby the peak frequencies that are in the harmonic oscillation series relation at equal intervals are emphasized; and (3) The method of measuring tension applied to an optical fiber being drawn according to the item (2), characterized in that, when emphasizing the peak frequencies that are in the harmonic oscillation series relation at equal intervals by calculating autocorrelation of the spectrum components, data obtained after the calculation of the autocorrelation are smoothed.

The inventors of the present invention have made extensive studies in view of the above points and obtained the following findings as a result. That is:

When determining the fundamental oscillation frequency of the optical fiber based on the peak frequencies contained in the spectrum components of the oscillation waveform of the optical fiber, it is carried out first specifying, as the harmonic oscillation series group, the group of peak frequencies containing at least two peak frequencies, in which the interval between the frequency zero (0) and the first peak frequency, the interval between the first peak frequency and the second peak frequency, . . . , and the interval between the (n−1)th peak frequency and the nth peak frequency (in which n is a natural number) are equal to each other, from among a plurality of peak frequencies contained in the spectrum components, thereby peak frequencies, which do not correspond to the harmonic oscillation series group and are not periodical, are judged to be noises and removed from the group of peak frequencies; and, subsequently, determining the fundamental oscillation frequency of the optical fiber based on the respective peak frequencies contained in the harmonic oscillation series group. According to the above, it becomes possible to accurately obtain the fundamental oscillation frequency of the optical fiber.

Further, when extracting the harmonic oscillation series group, by calculating autocorrelation of the spectrum components, thereby emphasizing the peak frequencies that are in the harmonic oscillation series relation at equal intervals, the harmonic oscillation series group can be easily and certainly specified.

Furthermore, when calculating autocorrelation of the spectrum components, to emphasize the peak frequencies that are in the harmonic oscillation series relation at equal intervals, by smoothing data obtained after the calculation of the autocorrelation, the harmonic oscillation series group can be more easily and certainly specified.

Hereinafter, an embodiment of the present invention will be described with reference to the drawings.

FIG. 1 is an explanatory diagram showing an example of an optical fiber drawing device that can be used for the method of measuring tension applied to an optical fiber being drawn according to the present invention. In the drawing device shown as an example in FIG. 1, an optical fiber preform (source material) 2 inserted into a heating furnace 1 is melted by heating from its lower end portion by a heater 3, and the resulting melted portion thereof is drawn, to thereby manufacture a secondary coated optical fiber 4c consecutively through a preparing process in the following order: the optical fiber preform 2→an optical fiber 4a→a primary coated optical fiber 4b→the secondary coated optical fiber 4c.

In FIG. 1, the heating furnace 1 has a cylindrical carbon-made heater 3 built therein. A ring-shaped outer diameter gauge 5 is provided for measuring an outer diameter of the optical fiber 4a immediately after being drawn and coming out of the heating furnace 1. A cooler 6 in an elongate cylindrical shape is provided for cooling the optical fiber 4a having passed through the outer diameter gauge 5. A non-contact type oscillation detecting sensor 7 is provided for detecting oscillation of the optical fiber 4a, which has passed through the cooler 6 and is passing therethrough, and the sensor is composed of, for example, a laser displacement gauge. A first coating die 9 is provided for forming a primary coating layer by coating a thermosetting resin or a UV curing resin on an outer peripheral surface of the optical fiber 4a passing therethrough. A first coat hardener 10 is provided for curing the coating resin coated on the primary coated optical fiber 4b passing therethrough. The first coat hardener 10 to be used is, for example, of a heating type in a case where the coating resin is the thermosetting resin, and is of a UV-ray irradiation type in a case where the coating resin is the UV curing resin. A second coating die 11 and a second coat hardener 12 are substantially the same as or similar to the first coating die 9 and the first coat hardener 10 already described, respectively. A turn sheave 13 is provided for changing an advancing direction of the secondary coated optical fiber 4c having passed through the second coat hardener 12 so as to direct the secondary coated optical fiber 4c to a winder (not shown).

A system of tension measurement in the optical fiber drawing device shown in FIG. 1 is constructed of the non-contact type oscillation detecting sensor 7, a tensiometer 8 for calculating tension T of the optical fiber 4a based on a signal inputted from the non-contact type oscillation detecting sensor 7, and the like. These devices are electrically connected with each other in an order of, for example, the non-contact type oscillation detecting sensor 7→the first tensiometer 8.

In the device exemplified in FIG. 1, the tensiometer 8 is composed of a personal computer, a programmable computer, or the like.

With the optical fiber drawing device shown in FIG. 1, the optical fiber 4a, the primary coated optical fiber 4b, the secondary coated optical fiber 4c and the like are manufactured from the optical fiber preform 2 step-by-step and consecutively as follows.

The optical fiber preform 2 that is inserted into the heating furnace 1 at a substantially constant speed is melted by heating from its lower end portion by the heater 3 in the furnace, and the melted portion is taken-out at a speed of, for example, 100 m to 1500 m per minute, thereby an extremely fine optical fiber 4a having a diameter of, for example, 125 µm is obtained. The optical fiber 4a immediately after coming out of the heating furnace 1 is measured of its outer diameter by the outer diameter gauge 5 and is cooled inside the cooler 6.

The optical fiber 4a having passed through the cooler 6 is detected of its oscillation by the non-contact type oscillation detecting sensor 7. Thereafter, the optical fiber 4a is coated with a resin by means of the first coating die 9 to become the primary coated optical fiber 4b, and the primary coating layer is cured by the first coat hardener 10.

The primary coated optical fiber 4b having passed through the coat hardener 10 becomes the secondary coated optical fiber 4c through resin coating by the second coating die 11, and the secondary coating layer is cured by the second coat hardener 12.

Further, the secondary coated optical fiber 4c having passed through the second coat hardener 12 is wound by the winder (not shown) via the turn sheave 13.

In the example described above with reference to FIG. 1, the non-contact type oscillation detecting sensor 7 arranged in a predetermined position detects the oscillation of the optical fiber 4a, and the tensiometer 8 to which the oscillation detecting signal is inputted from the non-contact type oscillation detecting sensor 7 calculates the tension T of the optical fiber 4a.

Figure 2:
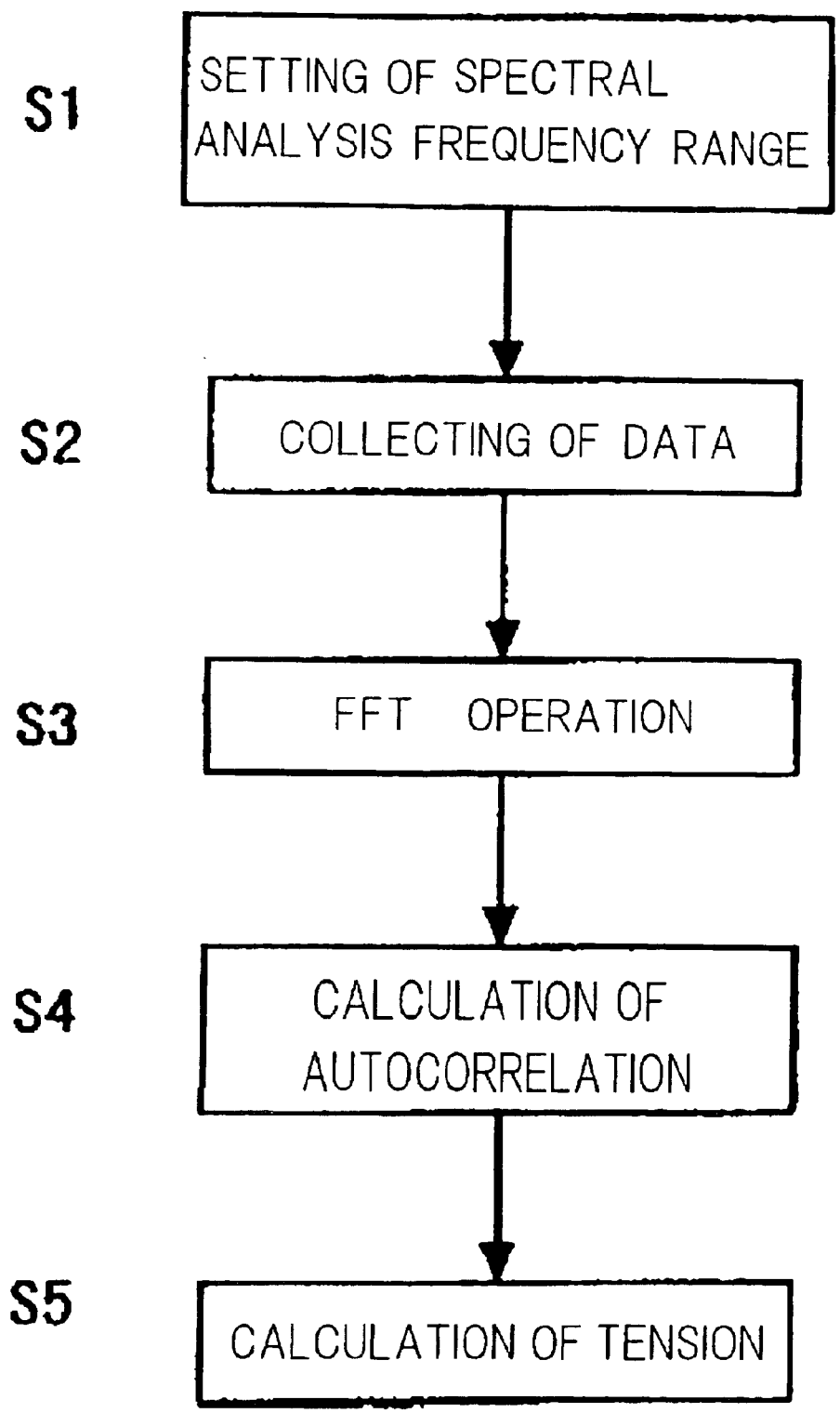
FIG. 2 is a flow chart exemplifying respective steps for obtaining tension applied to an optical fiber being drawn, in accordance with an embodiment of the present invention.

In the present invention, in a case where the oscillation of the optical fiber is detected by the non-contact type oscillation detecting sensor and the tension applied to the optical fiber is obtained based on the detected data with a tensiometer, the following Step S1 to Step S5 shown in FIG. 2 are adopted as one specific example.

Step S1: Setting of Spectral Analysis Frequency Range

A spectral analysis frequency range is set. Specifically, the spectral analysis frequency range is set as an initial value of the tensiometer 8.

Step S2: Collecting of Data

In the tensiometer 8, data of a line position are collected, for example, for several tens of seconds from the non-contact type oscillation detecting sensor 7 by setting a sampling interval of several msec to several tens msec. The data of a line position collected for that several tens of seconds are then memorized.

Step S3: FFT Operation

The line position data are subjected to operation using FFT (fast Fourier transform), to obtain Fourier components of discrete data.

Step S4: Calculation of Autocorrelation

From among a plurality of peak frequencies contained in the spectrum components that are obtained as a result of the FFT operation in Step S3, a group of peak frequencies containing at least two peak frequencies, in which an interval between a frequency zero (0) and a first peak frequency, an interval between the first peak frequency and a second peak frequency, . . . , and an interval between an (n−1)th peak frequency and an nth peak frequency (in which n is a natural number) are equal to each other, is specified as a harmonic oscillation series group.

When specifying the harmonic oscillation series group, it is preferable to calculate autocorrelation of the spectrum components to emphasize the peak frequencies that are in the harmonic oscillation series relation at equal intervals so as to certainly specify the harmonic oscillation series group. Here, the term "emphasizing" means a procedure, in which peak frequencies, which do not correspond to the harmonic oscillation series group and are not periodical, are judged to be noises and removed from the group of peak frequencies, and only the peak frequencies that are in the harmonic oscillation series relation at equal intervals are allowed to remain.

When calculating the autocorrelation in Step S4, the following equation (2) can be used.

$$\rho(k) = \frac{\sum_{i=1}^{n-k} x(i+k) \cdot x(i) - \bar{x}_0(k) \cdot \bar{x}_k(k)}{\sqrt{\left\{\sum_{i=1}^{n-k} x^2(i) - \bar{x}_0^2(k)\right\}\left\{\sum_{i=1}^{n-k} x^2(i+k) - \bar{x}_k^2(k)\right\}}}$$

Figure 3:
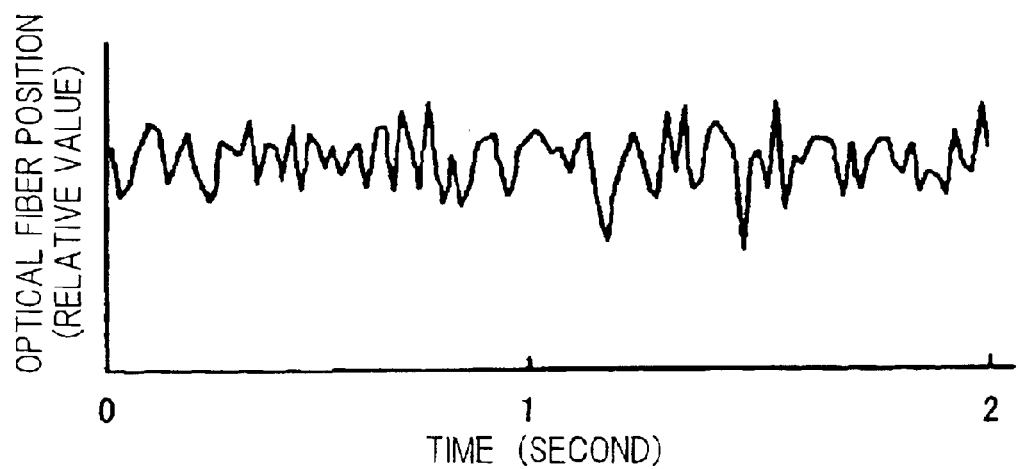
FIG. 3 is a waveform diagram showing an example of an oscillation waveform of an optical fiber.
Figure 4:
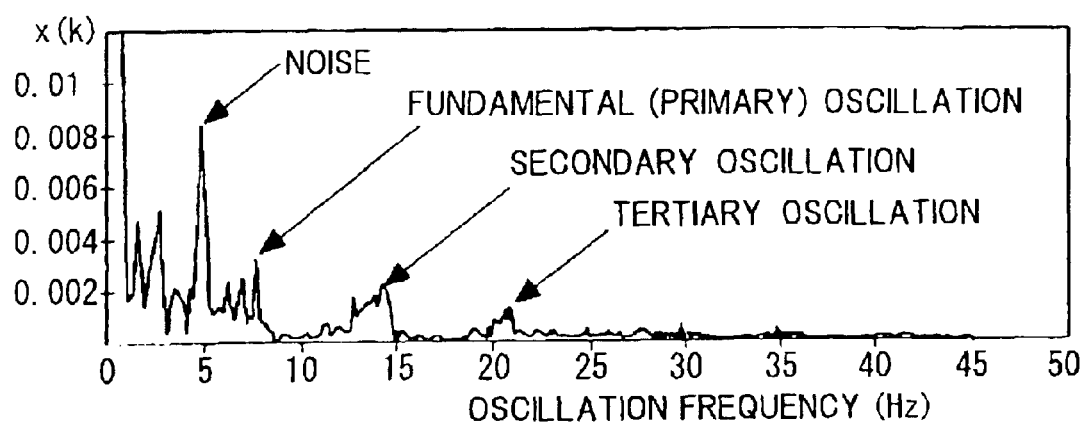
FIG. 4 is a waveform diagram showing a result of subjecting the waveform diagram of FIG. 3 to spectrum analysis.

Equation (2)

in which $\bar{x}_0(k) = \frac{1}{n-k} \sum_{i=k+1}^{n} x(i)$ $\bar{x}_k(k) = \frac{1}{n-k} \sum_{i=1}^{n-k} x(i)$ Here, FIG. 3 shows an example of an oscillation waveform of an optical fiber, and FIG. 4 shows spectrum components obtained through the FFT operation of the oscillation waveform of FIG. 3.

Specifically, using the equation (2) above, n spectrum data indicated by the spectrum waveform diagram of FIG. 4 are read as discrete data with respect to a frequency axis. Next, autocorrelation ρ (k) with respect to kth data x (k) (in which k is an integer of from 1 to n) that is arranged on the frequency axis of FIG. 4 is obtained using the equation (2) above. The number n of data is enough to be a number that corresponds to the number of frequencies exceeding the number of peak frequencies to be detected.

Figure 5:
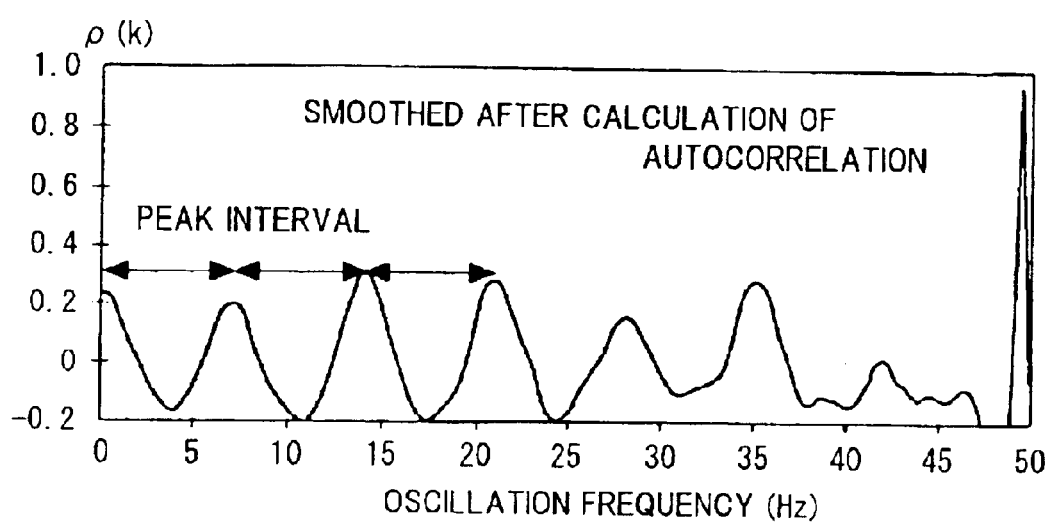
FIG. 5 is a waveform diagram showing a result of calculating autocorrelation of spectrum components shown in the waveform diagram of FIG. 4 and thereafter smoothing it.

FIG. 5 shows a result obtained from the calculation of the autocorrelation of the spectrum components shown in FIG. 4 in Step S4 above. It is preferable that data are smoothed after the calculation of the autocorrelation, and thus FIG. 5 shows the data having been smoothed. Here, the term "smoothing" means removal of influence caused by noise components having small amplitude, and smoothing can be performed in a usual manner. Comparing FIG. 5 to FIG. 4, the peak frequencies in FIG. 4, which do not correspond to the harmonic oscillation series group and are not periodical, are judged to be noises and removed from the spectrum components, so that peaks exist only in frequencies that correspond to the harmonic oscillation series group in FIG. 5.

Step S5: Calculation of Tension

A fundamental oscillation frequency of the harmonic oscillation series group specified in Step S4 (a peak in the lowest frequency) is determined as the fundamental oscillation frequency f of the optical fiber, and the value thereof is substituted for the equation (1), to obtain the tension T of the optical fiber.

As a result of performing the steps shown in FIG. 2, the tension applied to the optical fiber being drawn is measured substantially accurately regardless of noise conditions.

The embodiment of the present invention is not limited to the one described above, in which concrete examples of the respective steps are shown in FIG. 2, and the present invention can be freely modified within the scope of the invention as described in the accompanied claims. For example, the number of peak frequencies of the harmonic oscillation series group specified in Step S4 may be any number as long as the number is two or more. Further, it is needless to mention that, in Step S5, a change may be performed in which an average value of the peak frequency intervals of the harmonic oscillation series group specified in Step S4 is determined as the fundamental oscillation frequency f of the optical fiber.

According to the present invention, when determining the fundamental oscillation frequency of the optical fiber based on the peak frequencies contained in the spectrum components of the waveform of the optical fiber, the group of at least two peak frequencies, which are contained in the spectrum components and are in the harmonic oscillation series relation at equal intervals, is first specified as the harmonic oscillation series group. According to the above, the peak frequencies, which do not correspond to the harmonic oscillation series group and are not periodical, are judged to be noises and removed from the group of peak frequencies. Next, the fundamental oscillation frequency of the optical fiber is determined based on the respective peak frequencies contained in the harmonic oscillation series group. In this way, the fundamental oscillation frequency of the optical fiber can be accurately obtained.

Further, according to the present invention, when extracting the harmonic oscillation series group, the autocorrelation of the spectrum components is calculated and the peak frequencies that are in the harmonic oscillation series relation at equal intervals are emphasized. According to the above, the harmonic oscillation series group can be easily and certainly specified. As a result, the tension applied to the optical fiber being drawn can be more accurately measured.

Furthermore, according to the present invention, when calculating the autocorrelation of the spectrum components, to emphasize the peak frequencies that are in the harmonic oscillation series relation at equal intervals, the data after the calculation of the autocorrelation are smoothed. According to the above, the harmonic oscillation series group can be more easily and certainly specified.

INDUSTRIAL APPLICABILITY

According to the method of the present invention, it is possible to more accurately, easily and stably measure the tension applied to the optical fiber when it is being drawn, utilizing the oscillation waveform of the optical fiber. Therefore, the method of the invention is preferable when applied as a method of stably manufacturing the optical fiber, by controlling the tension applied to the optical fiber being drawn and by reducing the change in the transmission characteristics of the resultant optical fiber in the longitudinal direction thereof.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A method of measuring tension applied to an optical fiber being drawn, which comprises: measuring oscillation of the optical fiber when drawing into the optical fiber; subjecting a waveform of the oscillation to frequency analysis to obtain spectrum components; determining a fundamental oscillation frequency of the optical fiber based on peak frequencies contained in the spectrum components; and converting the fundamental oscillation frequency into the tension applied to the optical fiber being drawn, characterized in that the determination of the fundamental oscillation frequency of the optical fiber is performed through the steps comprising:

specifying, as a harmonic oscillation series group, a group of peak frequencies containing at least two peak frequencies, in which an interval between a frequency zero (0) and a first peak frequency, an interval between the first peak frequency and a second peak frequency, . . . , and an interval between an (n−1)th peak frequency and an nth peak frequency (in which n is a natural number) are equal to each other, from among a plurality of peak frequencies contained in the spectrum components; and determining the fundamental oscillation frequency of the optical fiber based on the respective peak frequencies contained in the specified harmonic oscillation series group.

2. The method of measuring tension applied to an optical fiber being drawn according to claim 1, characterized in that, when specifying the harmonic oscillation series group, autocorrelation of the spectrum components is calculated, thereby the peak frequencies that are in the harmonic oscillation series relation at equal intervals are emphasized.

3. The method of measuring tension applied to an optical fiber being drawn according to claim 2, characterized in that, when emphasizing the peak frequencies that are in the harmonic oscillation series relation at equal intervals by calculating autocorrelation of the spectrum components, data obtained after the calculation of the autocorrelation are smoothed.

* * * * *